United States Patent [19]

Nishihama et al.

[11] Patent Number: 4,774,552
[45] Date of Patent: Sep. 27, 1988

[54] APPARATUS FOR AND METHOD OF POSITIONING AND HOLDING PHOTOSENSITIVE MATERIAL

[75] Inventors: Takamichi Nishihama; Kiyoshi Matsumoto, both of Shiga, Japan

[73] Assignee: Dainippon Screen Mfg. Co., Ltd., Japan

[21] Appl. No.: 104,655

[22] Filed: Oct. 5, 1987

[30] Foreign Application Priority Data

Oct. 16, 1986 [JP] Japan ................ 61-246524

[51] Int. Cl.$^4$ .................................................. G03B 27/60
[52] U.S. Cl. ........................................ 355/73; 355/91
[58] Field of Search ............ 355/28, 73, 91, 92, 355/94

[56] References Cited

U.S. PATENT DOCUMENTS

| | | | |
|---|---|---|---|
| 3,634,009 | 1/1972 | Van Dusen et al. | 355/73 X |
| 4,029,404 | 6/1977 | Mizukami et al. | 355/91 |
| 4,089,603 | 5/1978 | Jacobs | 355/73 |
| 4,408,872 | 10/1983 | Vaughan | 355/64 X |
| 4,526,463 | 7/1985 | Hickey et al. | 355/91 X |
| 4,707,125 | 11/1987 | Ohlig et al. | 355/73 X |
| 4,723,152 | 2/1988 | Ohtorii et al. | 355/28 |

Primary Examiner—Richard A. Wintercorn
Attorney, Agent, or Firm—Ostrolenk, Faber, Gerb & Soffen

[57] ABSTRACT

An apparatus for positioning and holding a photosensitive material comprises: a case provided movably in a back-and-forth direction on a transparent plate held on a table frame of a copying apparatus; an overlay sheet to be spread over the photosensitive material, having one end fixed to a rear end of the transparent plate and another end held by a sheet roller in the case in a yieldable and retractable manner; stopper members provided on the table frame for placing the case in a desired position in the back-and-forth direction; contact members held by the case for positioning the photosensitive material in a transverse direction, with which at least two right-angled edges of the photosensitive material are brought into contact; and an evacuating device for evacuating air trapped between the overlay sheet and the transparent plate after positioning of the photosensitive material.

29 Claims, 4 Drawing Sheets

APPARATUS FOR AND METHOD OF POSITIONING AND HOLDING PHOTOSENSITIVE MATERIAL

BACKGROUND OF THE INVENTION

1. Field of the Invention

The present invention relates to an apparatus for an a method of positioning and holding a photosensitive material to be used in a reproduction apparatus and particularly to an apparatus for and a method of positioning and holding a photosensitive material or the like having a sheet form to be placed on a photographing portion shaped like a table (referred to hereinafter as a photographing table) of a process camera.

2. Description of the Prior Art

It is well known that such a conventional process camera as shown in FIG. 1 has been used in graphic arts.

This vertical-type process camera comprises: a photographing table 2 provided in an upper portion of a frame body 1 and having a transparent plate 12; a lens mount 4 with a lens 5, provided under the photographing table 2 and movable vertically by means of bellows 3; an original table 7 having a pair of light sources 6, provided under the lens mount 4 in a vertically movable manner; and a transparent pressure plate 8 placed on the original table 7 for fixedly holding an original between the table 7 and the pressure plate 8. Thus, an image of the original held between the original table 7 and the pressure plate 8 is focused on a transparent plate 12 of the photographing table 2 through the lens 5 with a desired magnification and a photosensitive material 10 placed on the transparent plate 12 with its photosensitive surface directed downward is exposed so that the image is printed on the material 10.

The photographing table 2 comprises means 19 for positioning and holding the photosensitive material as shown in FIG. 2, as is well-known in the prior art.

More specifically, the positioning and holding means 19 comprises: a positioning mark sheet 21 having corner marks 22 for positioning along an optical axis of the camera the photosensitive material 10 placed on the transparent plate 12 of the photographing table 2; a light intercepting device 23 for spreading a light intercepting overlay sheet 25 over the mark sheet 21 under which the photosensitive material 10 is placed; and evacuation means 16 for evacuating the air between the transparent plate 12 and the overlay sheet 25 placed thereon through an evacuation channel 13 provided in peripheral portions of the transparent plate 12. The photosensitive material 10 is positioned between the transparent plate 12 and the mark sheet 21 by setting the corners of the photosensitive material 10 to the corner marks 22 while inserting the photosensitive material 10 therebetween. A sheet roller 26 of the light intercepting device 23 is rotated toward a front side directed to an operator, so as to spread the overlay sheet 25 on the photographing table 2. Then, the evacuation means 16 is operated to remove air trapped between the overlay sheet 25 and the transparent plate 12 of the table 2, whereby the photosensitive material 10 is retained in a desired position. The mark sheet 21 is, for example, of a flexible sheet member having one surface translucent for enabling the operator to check an image focused on the transparent plate 12. A rear end portion of the overlay sheet 25, opposite to the front side, is fixed on a rear edge portion of the table 2 by means of a presser plate 46 and fixing screws 47. A rear end portion of the mark sheet 21 may be fixed by means of an adhesive tape or the like as required.

It is to be noted, however, that the above mentioned positioning mark sheet 21 can be used only when the operator is allowed to visually check a positional relation between the corner marks 22 and the photosensitive material 10. In other words, the above mentioned mark sheet 21 can be used only in the case of a photosensitive material permitted to be used under safety light, but cannot be used in the case of a photosensitive material permitted to be used only in utter darkness, such as a panchromatic film.

Accordingly, in the latter case, a positioning method called a register pin system, for example, is used conventionally. In the register pin system, a pin bar 28 having register pins 29 is fixed in a desired position on the transparent plate 12 by using an adhesive tape or the like, as shown by broken lines in FIG. 2, and pin holes corresponding to the register pins 29 are provided in the photosensitive material 10, so that the operator can manually position the photosensitive material with precision even in utter darkness by fitting the register pins 29 into the pin holes.

However, in the register pin system, it is necessary as a preparatory step to form pin holes in the photosensitive material after the pin bar 28 is fixed on the transparent plate 12 and it is also necessary to change the position of the pin bar 28 each time the size of a photosensitive material to be used is changed. In addition, it is necessary to completely remove the remaining material of the adhesive tape or the like torn off from the transparent plate 12 each time, thereby to avoid considerable decrease of picture quality. Thus, the register pin system requires troublesome preparation and aftertreatment, causing efficiency of work to be lowered. Furthermore, for such work in utter darkness, the mark sheet is unsuitable or rather a nuisance.

SUMMARY OF THE INVENTION

Therefore, a primary object of the present invention is to provide an apparatus for and a method of positioning and holding a photosensitive material, in which a position of the photosensitive material can be easily defined not only under safety light but also in utter darkness, which leads to an improvement of working efficiency.

Briefly stated, the present invention in directed to an apparatus for and a method of positioning and holding a photosensitive material on a transparent plate of a photographing portion of a reproduction apparatus, and this positioning and holding apparatus comprises position defining means for defining a desired position for the photosensitive material to be placed on the transparent plate, and a light intercepting device for spreading an overlay sheet over the photosensitive material on the transparent plate, the position defining means being held by the light intercepting device, whereby the photosensitive material is positioned and held between the overlay sheet and the transparent plate as a result of evacuation of air trapped therebetween.

Thus, the position defining means is provided to define a desired position for the photosensitive material both in a back-and-forth direction and in a transverse direction on the transparent plate. Accordingly, in order to position the photosensitive material, it is only necessary to define a desired position of the photosensitive material under a condition in which the operator can visually examine it and then to place the photosensitive material in the position defined by the position defining means. Therefore, the photosensitive material can be easily positioned not only under safety light but also in utter darkness and as a result working efficiency can be remarkably improved.

In a preferred embodiment of the present invention, position defining for the photosensitive material in the back-and-forth direction is effected by positioning the light intercepting device in the back-and-forth direction on the transparent plate and position defining in the transverse direction is effected by positioning a transverse position defining means provided on the light intercepting device.

More specifically, the position defining means for photosensitive material in accordance with the present invention comprises: back-and-forth positioning means for placing the light intercepting device in a desired position in the back-and-forth direction; positioning contact means attached to a case of the light intercepting device and with which at least two right-angled edges of the photosensitive material are brought into contact; and transverse positioning means for positioning at least a side edge contact plate of the contact means in a desired position in the transverse direction, whereby a position of the photosensitive material is defined by the positioning contact means.

The above described construction of the position defining means for photosensitive material makes it possible to define a position in the back-and-forth direction and in the transverse direction by utilizing the light intercepting device which is a component of a conventional copying apparatus.

In a further preferred embodiment of the invention, the back-and-forth positioning means comprises scale plates enabling detection of a position of the light intercepting device in the back-and-forth direction, and the transverse positioning means comprises a scale plate enabling detection of a position of the contact means in the tranverse direction on the light intercepting device.

The above described construction of the positioning means makes it easy to position a photosensitive material.

These objects and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of an apparatus for positioning and holding a photosensitive material in accordance with the present invention will be described in the following with reference to FIGS. 3 to 5.

Figure 1:
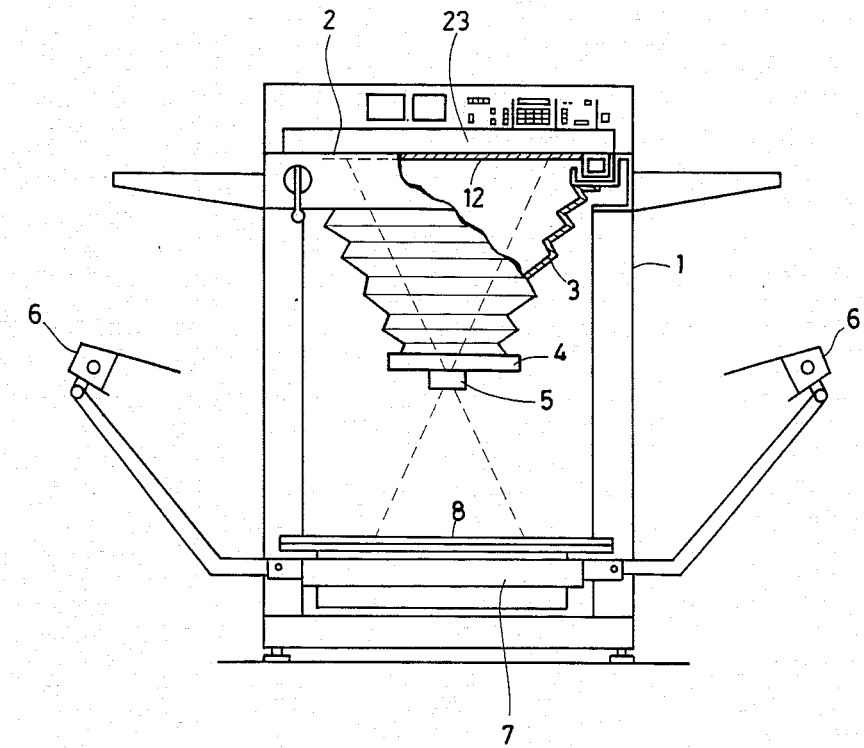
FIG. 1 is a front view of a conventional process camera comprising a photographing table.
Figure 2:
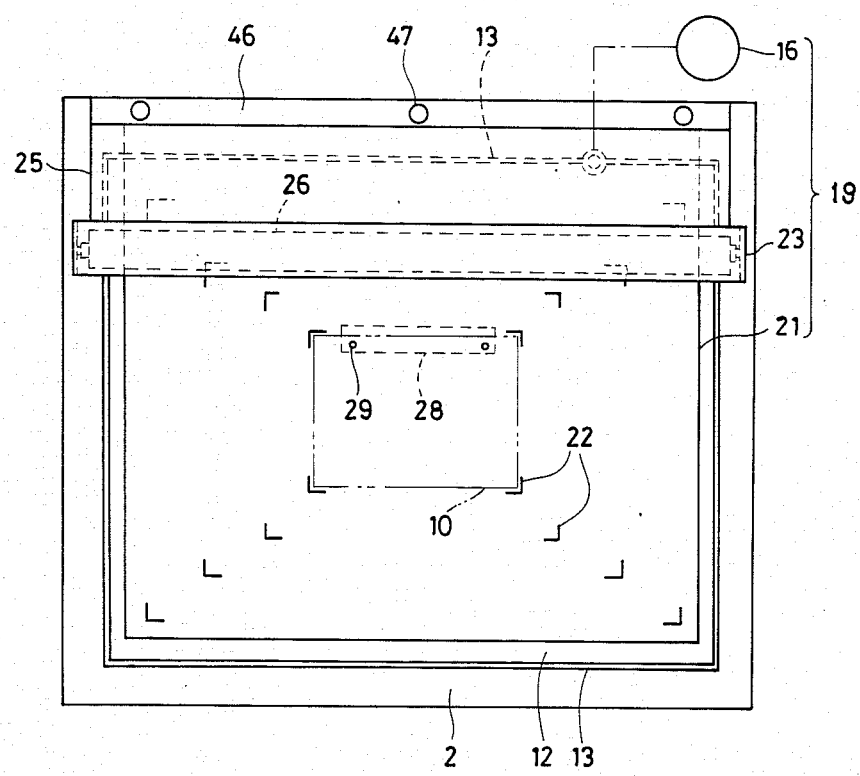
FIG. 2 is a plan view of a photographing table comprising a conventional positioning and holding apparatus.
Figure 3:
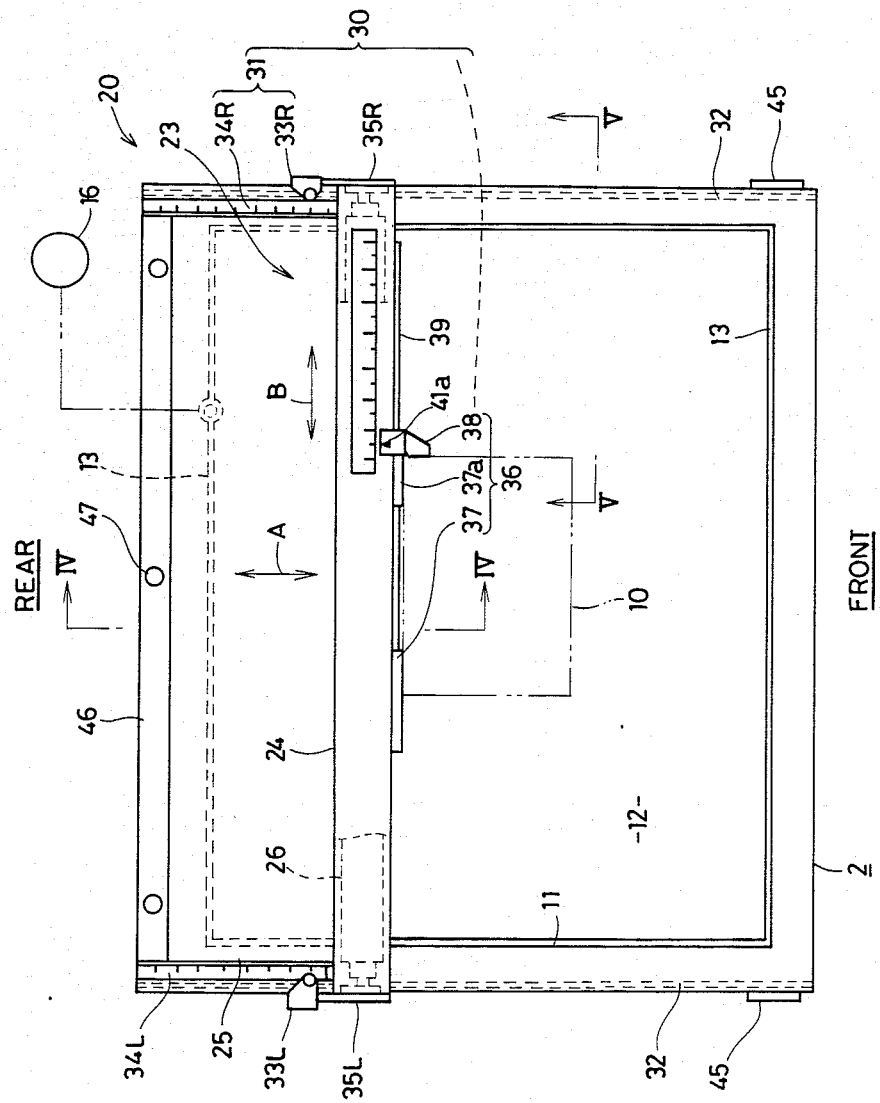
FIG. 3 is a plan view of a photographing table comprising an apparatus for positioning and holding a photosensitive material in accordance with present invention.
Figure 4:
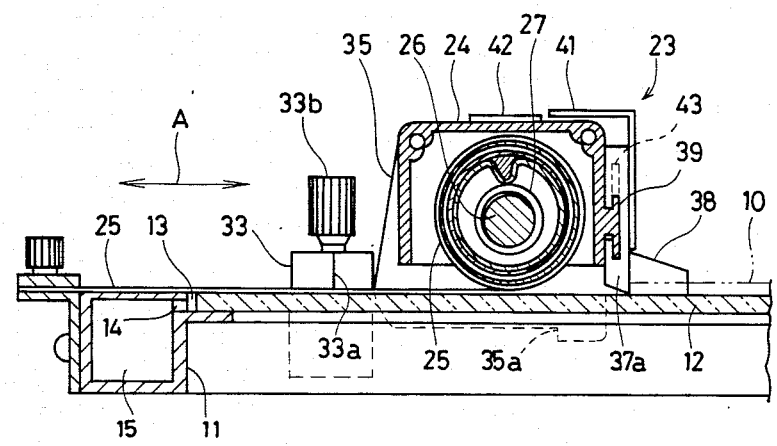
FIG. 4 is a sectional view taken along the line IV—IV in FIG. 3.
Figure 5:
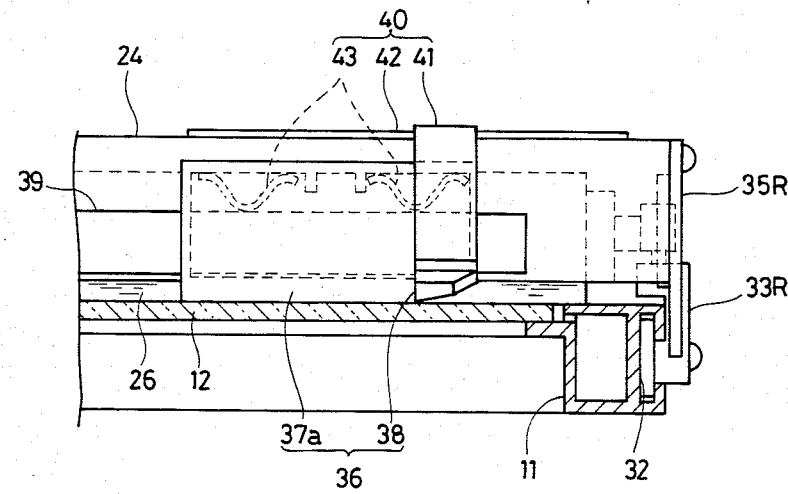
FIG. 5 is a sectional view taken along the line V—V in FIG. 3.

FIG. 3 is a plan view of a photographing table of a process camera comprising the embodiment of the present invention and FIGS. 4 and 5 are sectional views taken along the lines IV013 IV and V—V in FIG. 3, respectively. Construction of the process camera is similar to that shown in FIG. 1 and therefore description thereof is omitted.

The photographing table 2 is provided in an upper portion of a frame body of the process camera and the photographing table 2 comprises a table frame 11 formed by a rectangular member and a transparent plate 12 fitted in a rectangular space formed by the table frame 11 and fixed in the almost same plane as the upper surface of the table frame 11. An evacuation channel 13 is formed in peripheral portions of the transparent plate 12 and is connected with evacuation means 16 such as a vacuum pump or the like through a communication path 14 and a suction path 15 in the table frame 11.

The photographing table 12 comprises a positioning and holding apparatus 20. More specifically, the positioning and holding apparatus 20 of this embodiment comprises a light intercepting device 23, position defining means 30 for defining a desired position for a photosensitive material 10, and the above mentioned evacuation means 16 for evacuating air between the transparent plate 12 and an overlay sheet 25.

The light intercepting device 23 has an elongate case 24 for containing a sheet roller 26 on which the overlay sheet 25 formed of a light intercepting material is rolled. The sheet roller 26 is urged to be rotated by a coil spring 27, so that the overlay sheet 25 is urged to be wound to be in a retractable manner but is allowed to be yielded when the overlay sheet 25 is pulled in the yielding direction. The end of the overlay sheets is secured to the rear side.

The position defining means 30 comprises: back-and-forth positioning means 31 for setting the light intercepting device 23 to a desired position in a back-and-forth direction shown by arrows A; positioning contact means 36 provided on the case 24 of the light intercepting device 23, with which edges of the photosensitive material 10 are brought into contact; and transverse positioning means 40 for setting a side edge contact claw 38 of the contact means to a desired position in a transverse direction shown by arrows B.

The back-and-forth positioning means 31 comprises stopper members 33R and 33L and scale plates 34R and 34L, the stopper members 33R and 33L including presser plates 33Rc and 33Lc, respectively, movable in the back-and-forth direction along guide grooves 32R and 32L, respectively, formed in both side portions of the photographing table 2. The stopper members 33R and 33L are fixed by means of fixing screws 33Rb and 33Lb by setting pointers 33Ra and 33La of the stopper members 33R and 33L to adequate points on the scale plates 34R and 34L, respectively, and when side plates 35R and 35L of the light intercepting device 23 contact front end surfaces of the stopper members 33R and 33L, respectively, the light intercepting device 23 is suitably positioned in the back-and-forth direction. Since the sheet roller 26 is urged to be rotated by the coil spring 27 so that the overlay sheet 25 urged to be wound to be in a retractable manner and the end of the overlay sheet 25 is secured to the rear side, while the overlay sheet 25 is urged to be wound in a retractable manner; however, the light intercepting device 23 is allowed to be wound in the opposite direction so that the overlay sheet 25 is yieldable to be spread over the transparent plate 12 when the device 23 is moved by an operator in the opposite direction.

The positioning contact means 36 is provided on a front surface of the case 24 of the light intercepting device 23 and include rear edge contact plates 37 which a rear edge of the photosensitive material 10 is to contact, and the above mentioned claw 38 which a right side edge of the photosensitive material 10 is to contact. A movable plate 37a of the rear edge contact plates 37 and the claw 38 are integrally formed as a unitary member, which is movable in the transverse direction along a guide 39 provided on the front surface of the case 24.

The transverse positioning means 40 comprises an index plate 41 attached to the claw 38, a scale plate 42 attached on an upper surface of the case 24 of the light intercepting device 23, and plate springs 43 provided inside the movable plate 37a of the rear edge contact plates 37. Thus, the claw 38 is positioned in the transverse direction by setting a pointer 41a of the pointer plate 41 to an adequate point on the scale plate 42. The plate springs 43 are placed against the upper end surface of the guide 39 to apply friction resistance thereto, whereby the transverse positioning means 40 is maintained in desired positions.

Now, operation of the above described positioning and holding apparatus will be described. First of all, the operator moves manually the stopper memebers 33R and 33L and sets positions of the stopper members 33R and 33L of the back-and-forth positioning means 31 according to a dimension in the back-and-forth direction of the photosensitive material 10 to be used and then fixes the stopper members 33R and 33L by means of the fixing screws 33Rb and 33Lb. After that, he moves manually the case 24 of the light intercepting device 23 toward the set positions of the stopper members 33R and 33L, while the overlay sheet 25 is yielded to be spread over the transparent plate 12 against the force of urging the overlay sheet 25 in a retractable manner. As a result, the rear end surfaces of the side plates 35R and 35L of the light intercepting device 23 are brought into contact with the front end surfaces of the thus fixed stopper members 33R and 33L, respectively, whereby the light intercepting device 23 is positioned in the back-and-forth direction.

Then, the operator moves the claw 38 of the positioning contact means 36 in the transverse direction and sets the position of the index plate 41 of the transverse positioning means 40 according to a dimension of the photosensitive material 10 in the transverse direction. Thus, the claw 38 is positioned in the transverse direction.

In the thus positioned state, the room, where the process camera is set, is lighted up by safety light (or usually the room has been thus lighted from the first). If a panchromatic material is to be used, all the lights are turned off to cause the room to be in utter darkness. After that, the photo sensitive material 10 is taken out from a storing box and the rear edge and the right side edge of the material 10 are put against the rear edge contact plates 37 and the claw 38, respectively, on the transparent plate 12 with the photosensitive surface of the material 10 being directed downward, whereby the photosensitive material 10 is positioned precisely. Subsequently, the case 24 of the light intercepting device 23 is slightly inclined downward to the rear side so that the lower ends of the rear edge contact plates 37 are raised from the upper surface of the transparent plate 12. In that state, the case 24 is moved toward the front side and stop portions 35Ra and 35La of the side plates 35R and 35L are stopped by fixing members 45R and 45L, respectively, in front end positions of the table 2.

When the case 24 is moved toward the front side while the overlay sheet 25 is further yielded to be spread over the transparent plate 12, the evacuation means 16 is operated to evacuate air trapped between the transparent plate 12 and the overlay sheet 25, whereby the photosensitive material 10 is covered with the overlay sheet 25, while being held tightly between the overlay sheet 25 and the transparent plate 12. As a result, the upper surface of the table 2 is entirely covered with the overlay sheet 25. In that state, an exposure process can be performed. After the exposure process, the operation of the evacuation means 16 is stopped. While the case 24 of the light intercepting device 23 is moved to the rear side, the overlay sheet 25 is rolled on the rearward rotating sheet roller 26 as a function of the retractably urging force and thus the photosensitive material 10 appears. The case 24 is stopped in contact with the stopper members 33R and 33L of the back-and-forth positioning means 31 and then the photosensitive material 10 is taken away from the transparent plate 12 so that it is subjected to a development process.

Although the above described embodiment is related with the photographing table having an upper surface substantially horizontal, the photographing table 2 may have an upper surface inclined downward on the front side. In such case, positioning of a photosensitive material can be effected in the same manner. If the photosensitive material tends to fall toward the front side because of such inclination of the table 2, the positioning contact means 36 may be provided on a rear surface of the case 24, opposite to the front side of the table 2 to prevent the photosensitive material 10 from falling toward the front side and the light intercepting device 23 may be adapted to move from the front side toward the rear side to spread the overlay sheet 25.

In addition, although the positioning contact means 36 is adapted to move the right movable plate 37a of the rear edge contact plates 37 and the claw 38 as a unitary body in the above described embodiment, the present invention is not limited thereto. Only the claw 38 may be moved or the whole of the positioning contact means 36 may be formed as a unitary body and moved.

In addition, although the above described embodiment is related with a case in which positioning by the back-and-forth positioning means and the transverse positioning means is effected in advance by using scale plates corresponding to a size of a photosensitive material to be used, a plate member having the same size as that of the photosensitive material may be used to set positions of the back-and-forth positioning means and the transverse positioning means.

As described in the foregoing, an apparatus for positioning and holding a photosensitive material in accordance with the present invention uses, instead of a conventional positioning means such as a mark sheet or a register pin system, a light intercepting device for positioning of the photosensitive material in the back-and-forth direction and a positioning contact means for positioning of the photosensitive material in the transverse direction. More specifically, the light intercepting device which spreads a retractable overlay sheet over the photosensitive material is set in a desired position in the back-and-forth direction and the positioning contact means with which at least two right-angled edges of the photosensitive material are brought into contact is held by the light intercepting device and is set in a desired position in the transverse direction on the light intercepting device. Thus, the position where the photosensitive material is to be placed is defined and it is only necessary to place the photosensitive material in the thus defined position. Consequently, positioning of the photosensitive material becomes easy even in utter darkness without using a mark sheet which would be difficult to handle in utter darkness or a register pin system requiring troublesome preparation and aftertreatment. As a result, working efficiency not only in a condition under safety light but also in utter darkness can be remarkably improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for positioning and holding a photosensitive material in a prescribed position on a transparent plate placed on a table frame of a reproduction apparatus, comprising:
    a light intercepting device movable on said transparent plate in a back-and-forth direction along a line extending from a front side to a rear side or vice versa of said table frame and including an overlay sheet having one end fixed to either end of said transparent plate in the back-and-forth direction, to spread said overlay sheet over said transparent plate while moving in said back-and-forth direction,
    position defining means held by said light intercepting device for defining a desired position of said photosensitive material in the back-and-forth direction and in a transverse direction on said transparent plate, and
    evacuation means for evacuating air trapped between said overlay sheet and said transparent plate.

2. An apparatus for positioning and holding a photosensitive material in accordance with claim 1, wherein said position defining means comprises back-and-forth position defining means for defining a desired position of said photosensitive material in the back-and-forth direction on said transparent plate, and transverse position defining means for defining a desired position of said photosensitive material in the transverse direction.

3. An apparatus for positioning and holding a photosensitive material in accordance with claim 2, wherein said back-and-forth position defining means comprises back-and-forth positioning means provided on said table frame for positioning said light intercepting device on said transparent plate in the back-and-forth direction.

4. An apparatus for positioning and holding a photosensitive material in accordance with claim 3, wherein said transverse position defining means comprises contact members with which at least two right-angled edges of said photosensitive material are brought into contact, and transverse postioning means for positioning said contact member on said light intercepting device.

5. An apparatus for positioning and holding a photosensitive material in accordance with claim 4, wherein said light intercepting device comprises an overlay sheet holding device for holding said overlay sheet in a yieldable and retractable manner.

6. An apparatus for positioning and holding a photosensitive material in accordance with claim 5, wherein said overlay sheet holding device comprises means for urging said overlay sheet in a retractable manner and allowing said overlay sheet to be yieldable when said overlay sheet holding device is moved on the transparent plate.

7. An apparatus for positioning and holding a photosensitive material in accordance with claim 5, wherein said light intercepting device includes a case extending along the transverse direction having an upper surface, a front surface and a rear surface, said overlay sheet holding device being contained in said case.

8. An apparatus for positioning and holding a photosensitive material in accordance with claim 7, wherein said overlay sheet holding device comprises a sheet roller extending along the transverse direction and said overlay sheet is wound on said sheet roller while rotating.

9. An apparatus for positioning and holding a photosensitive material in accordance with claim 8, wherein said sheet roller partially projects from lower ends of the case of said light intercepting device, thereby to form an interstice between the lower ends of said case and said transparent plate, through which said overlay sheet is wound on said sheet roller.

10. An apparatus for positioning and holding a photosensitive material in accordance with claim 9, wherein a positional relation between said case and said sheet roller is selected to be a relation in which said light intercepting device is enabled to move with the lower ends of said case being spaced from said transparent plate and said photosensitive material is enabled to be positioned with the lower end of said case on the front side being in contact with said transparent plate as a result of slightly inclining said case downward on the front side.

11. An apparatus for positioning and holding a photosensitive material in accordance with claim 5, wherein said back-and-forth positioning means includes stopper members to be in contact with said light intercepting device to hold said light intercepting device at a desired position.

12. An apparatus for positioning and holding a photosensitive material in accordance with claim 11, wherein said table frame includes guide grooves in right and left side portions thereof parallel to the back-and-forth direction, and said stopper members include presser plates movable in the back-and-forth direction along said guide grooves and means for fixing said presser plates on said table frame.

13. An apparatus for positioning and holding a photosensitive material in accordance with claim 12, wherein said light intercepting device includes a guide extending in the transverse direction, and said transverse positioning means includes pressing members for pressing said contact members against said guide.

14. An apparatus for positioning and holding a photosensitive material in accordance with claim 13, wherein said stopper members include stopper members provided on a side to which said overlay sheet is to spread from said light intercepting device.

15. An apparatus for positioning and holding a photosensitive material in accordance with claim 14, wherein said back-and-forth positioning means includes scale plates provided on said table frame for determining positions of said stopper members for positioning said photosensitive material in the back-and-forth direction.

16. An apparatus for positioning and holding a photosensitive material in accordance with claim 15, wherein said transverse positioning means includes a scale plate extending on said light intercepting device in the transverse direction for determining a position of said contact members for positioning said photosensitive material in the transverse direction.

17. An apparatus for positioning and holding a photosensitive material in accordance with claim 8, wherein said back-and-forth positioning means includes stopper members to be in contact with said light intercepting device to stop movement of said light intercepting device; said table frame includes guide grooves provided in right and left side portions thereof parallel to the back-and-forth direction; said stopper members include presser plates movable in the back-and-forth direction along said guide grooves and means for fixing said presser plates on said table frame; said light intercepting device includes a guide extending in the transverse direction; and said transverse positioning means includes pressing members for pressing said contact members against said guide.

18. An apparatus for positioning and holding a photosensitive material in accordance with claim 17, wherein said case and said sheet roller are in a positional relation in which said sheet roller partially projects from lower ends of said case, thereby to form an interstice between the lower ends of said case and said transparent plate, through which said overlay sheet is wound on said sheet roller, and said positional relation between said case and said sheet roller is selected to be a relation in which said light intercepting device is enabled to move with the lower ends of said case being spaced from said transparent plate and said photosensitive material is enabled to be positioned with the lower end of said case on the front side being in contact with said transparent plate as a result of slightly inclining said case downward on the front side.

19. An apparatus for positioning and holding a photosensitive material in accordance with claim 18, wherein said stopper members include stopper members provided on a side to which said overlay sheet is to spread from said light intercepting device; said back-and-forth positioning means includes scale plates provided on said table frame for determining positions of said stopper members for positioning said photosensitive material in the back-and-forth direction; and said transverse positioning means includes a scale plate extending on said light intercepting device in the transparent direction for determining positions of said contact members for positioning said photosensitive material in the transverse direction.

20. A method of positioning and holding a photosensitive material in a prescribed position on a transparent plate held on a table frame of a copying apparatus, comprising the steps of:

providing a light intercepting device movable on said transparent plate in a back-and-forth direction along a line extending from a front side to rear side or vice versa of said table frame for causing an overlay sheet having an end fixed to either a front end or a rear end of said transparent plate to spread over said photosensitive material by movement of said light intercepting device in the back-and-forth direction, providing position defining means held by said light intercepting device for defining a desired position of said photosensitive material on said transparent plate in the back-and-forth direction and in a transverse direction, moving said light intercepting device on said transparent plate to spread said overlay sheet over said transparent plate, defining a position in the back-and-forth direction and in the transverse direction by said position defining means, placing said photosensitive material in the position defined by said position defining means, further moving said light intercepting device with said placed photosensitive material being temporarily held, to spread said overlay sheet, and evacuating air trapped between said overlay sheet and said transparent plate.

21. A method of positioning and holding a photosensitive material in accordance with claim 20, wherein said step of defining the position by said position defining means includes the steps of: defining a position of said photosensitive material in the back-and-forth direction, and defining a position of said photosensitive material in the transverse direction.

22. A method of positioning and holding a photosensitive material in accordance with claim 21, wherein said step of defining the position in the back-and-forth direction includes the steps of:

providing back-and-forth positioning means on said table frame for positioning said light intercepting device on said transparent plate in the back-and-forth direction, and positioning said light intercepting device on said transparent plate by said back-and-forth positioning means to define the position of said photosensitive material in the back-and-forth direction.

23. A method of positioning and holding a photosensitive material in accordance with claim 22, wherein said step of defining the position in the transverse direction includes the steps of:

providing contact members with which at least two right-angled edges of said photosensitive material are to be in contact, providing transverse positioning means on said light intercepting device for positioning said contact members in the transverse direction, and positioning said contact members by said transverse positioning means to define the position of said photosensitive material in the transverse direction.

24. A method of positioning and holding a photosensitive material in accordance with claim 23, wherein said step of providing said back-and-forth positioning means include the steps of:

providing scale plates on said table frame along the back-and-forth direction for determining the position of said photosensitive material in the back-and-forth direction, providing stopper members to be in contact with said light intercepting device to stop movement of said light intercepting device, and providing guide grooves in right and left side portions of said table frame parallel to the back-and-forth direction, and said step of positioning the light intercepting device by said back-and-forth positioning means includes the steps of:

determining positions of said stopper members by said scale plates, moving said stopper members to the determined positions along said guide grooves provided in the right and left side portions of said table frame, fixing said stopper members on said table frame, and bringing said light intercepting device into contact with said stopper members.

25. A method of positioning and holding a photosensitive material in accordance with claim 24, wherein said step of providing said transverse positioning means includes the steps of:

providing a scale plate extending on said light intercepting device in the transverse direction for determining the position of said photosensitive material in the transverse direction, providing a guide extending on the light intercepting device in the transverse direction, and providing pressing members for pressing said contact members against said guide, and said step of positioning said contact members by said transverse positioning means includes the steps of:

determining a position of at least one of said contact members by said scale plate, and moving said contact member to the determined position while pressing said contact member against said guide provided on said light intercepting device.

26. A method of positioning and holding a photosensitive material in accordance with claim 23, wherein said step of further moving said light intercepting device to spread said overlay sheet over said photosensitive material placed in the defined position includes the step of releasing, from said contact members, said at least two right-angled edges of said photosensitive material placed in the defined position.

27. A method of positioning and holding a photosensitive material in accordance with claim 26, wherein said light intercepting device comprises an overlay sheet holding device for holding said overlay sheet in a yieldable and retractable manner and a case extending in the transverse direction having an upper surface and opposed front and rear surfaces and containing said overlay sheet holding device, and said steps of releasing the edges of said photosensitive material from said contact members includes the step of inclining said case slightly downward on the rear side.

28. A method of positioning and holding a photosensitive material in accordance with claim 27, wherein said overlay sheet holding device extends in the transverse direction and comprises a sheet roller on which said overlay sheet is wound while rotating, said sheet roller being partially projected from lower ends of said case, said step of placing said photosensitive material in the position defined by said position defining means includes the step of inclining said case slightly downward on the front side to cause the lower end of said case on the front side to be in contact with said transparent plate, and said step of further moving said light intercepting device to spread said overlay sheet over said photosensitive material includes the step of turning the slightly inclined case to cause said case to be inclined downward on the rear side, thereby to prevent the lower ends of said case from being in contact with said transparent plate.

29. A method of positioning and holding a photosensitive material in accordance with claim 25, wherein said step of further moving said light intercepting device to spread said overlay sheet over said photosensitive material placed in the defined position includes the step of releasing said at least two right-angled edges of the positioned material from said contact members of said transverse position defining means, said light intercepting device includes an overlay sheet holding device for holding said overlay sheet in a yieldable and retractable manner, and a case extending in the transverse direction having an upper surface and opposite front and rear surfaces and containing said overlay sheet holding device, said step of releasing said edges of said photosensitive material from said contact members of said transverse position defining means includes the step of inclining said case slightly downward on the rear side, said overlay sheet holding device extends in the transverse direction and includes a sheet roller on which said overlay sheet is wound while rotating, said sheet roller being partially projected from lower ends of said case, said step of holding said photosensitive material in the desired position in the back-and-forth direction and in the transverse direction includes the step of inclining said case slightly downward on the front side to cause the lower end of said case on the front side to be in contact with said transparent plate, and said step of further moving said light intercepting device to spread said overlay sheet over said photosensitive material includes the step of turning the slightly inclined case to cause said case to be inclined downward on the rear side, thereby to prevent the lower ends of said case from being in contact with said transparent plate.

* * * * *